United States Patent [19]

Scaramucci

[11] Patent Number: 5,368,066
[45] Date of Patent: Nov. 29, 1994

[54] VALVE WITH SAFETY LOCK PLATE

[75] Inventor: John P. Scaramucci, Oklahoma City, Okla.

[73] Assignee: Balon Corporation, Oklahoma City, Okla.

[21] Appl. No.: 214,924

[22] Filed: Mar. 17, 1994

Related U.S. Application Data

[63] Continuation-in-part of Ser. No. 132,588, Oct. 6, 1993, Pat. No. 5,323,805.

[51] Int. Cl.⁵ ............................................. F16K 35/06
[52] U.S. Cl. .................................. 137/383; 137/377
[58] Field of Search ............................... 137/383, 377

[56] References Cited

U.S. PATENT DOCUMENTS

| | | | |
|---|---|---|---|
| 2,913,219 | 11/1959 | Freed | 251/288 |
| 3,401,715 | 9/1968 | Johnson et al. | 137/385 |
| 3,743,243 | 7/1973 | Scaramucci | 251/288 |
| 3,865,130 | 2/1975 | Mullis | 137/385 |
| 3,960,168 | 6/1976 | Plympton | 137/385 |
| 3,976,095 | 8/1976 | Koch et al. | 137/385 |
| 4,162,690 | 7/1979 | Anderson | 137/385 |
| 4,193,579 | 3/1980 | Massey | 251/288 |
| 4,534,379 | 8/1985 | Burge | 137/385 |
| 4,848,724 | 7/1989 | Pettinaroli | 137/385 |
| 5,014,528 | 5/1991 | Roberts | 251/288 |
| 5,052,655 | 10/1991 | Ackroyd | 137/385 |
| 5,058,622 | 10/1991 | Chitty, Jr. et al. | 137/385 |
| 5,115,834 | 5/1992 | Champagne | 137/385 |
| 5,139,041 | 8/1992 | Albrecht | 137/385 |
| 5,188,335 | 2/1993 | Pettaroli | 137/385 |

OTHER PUBLICATIONS

"Series L Ball Valve—The Economical, Low-pressure-sealing Ball Valve From DEMCO", Cooper Industries. (1992).
"Parts List", Texsteam Inc. Super 'G' Catalog. (1992).
"Accessories", W-K-M Catalog B. (1992).
"Watts Regulator Ball Valves For Compressed Air Service". (1992).
"Series E Ball Valve—2", 3" & 4" 600 psi CWP". (Oct. 14, 1986).
"Kim Industries Ball Valve Catalog". (1992).
"Just Out and . . . Outstanding! Tri Pac 525", Marpac. (1992).

Primary Examiner—A. Michael Chambers
Attorney, Agent, or Firm—Dunlap, Codding & Lee

[57] ABSTRACT

A locking structure for a valve of the type where the valve member is turned less than 360 degrees between fully open and fully closed positions as, for example, a ball valve. This structure employs a stop pin on the valve body positioned to be engaged by the handle of the valve in the fully open and closed positions of the valve. A lock plate structure is journaled on the valve stem and is arranged to engage the opposite side of the stop pin from the handle in the fully open and fully closed positions of the valve, such that when a lock is secured in mating apertures in the lock plate and the handle, the valve will be securely locked in either a fully open or fully closed position.

19 Claims, 5 Drawing Sheets

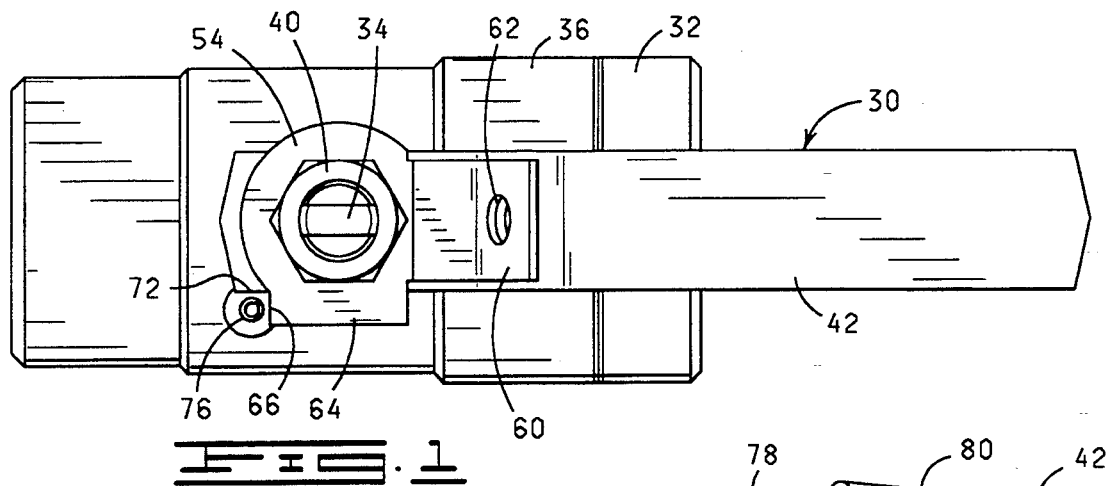
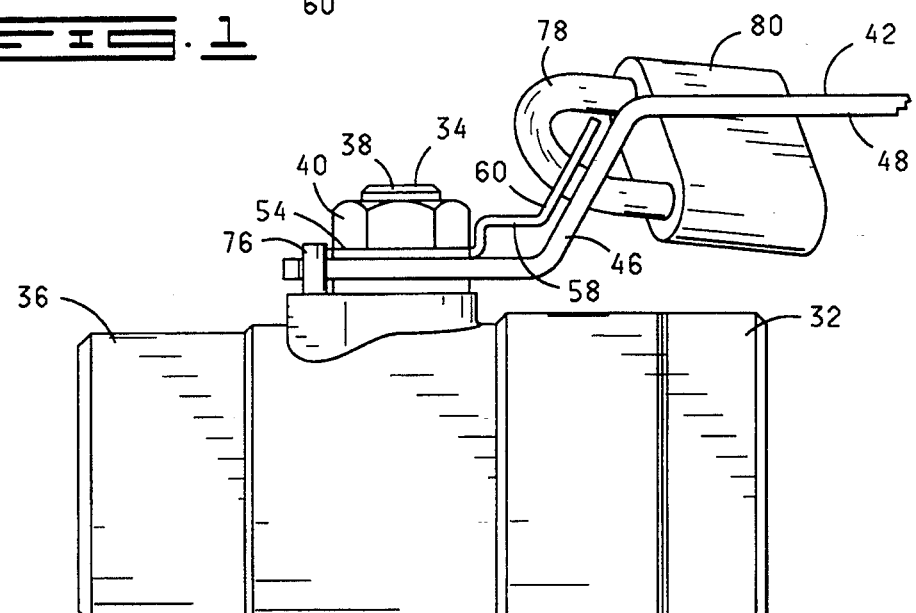
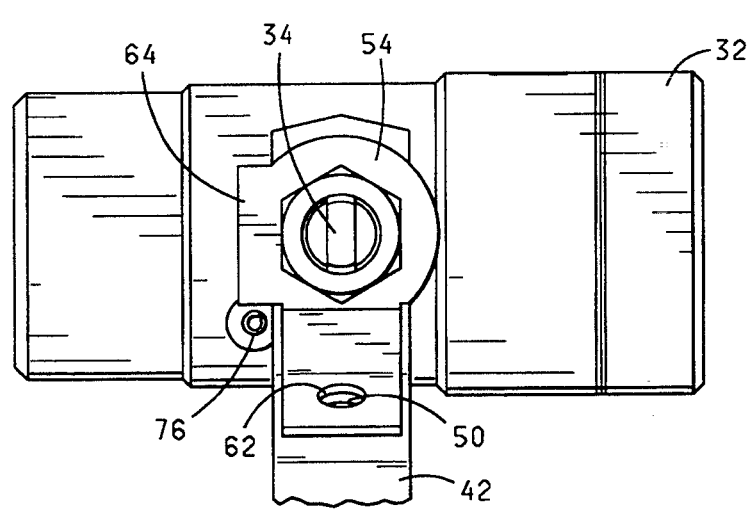

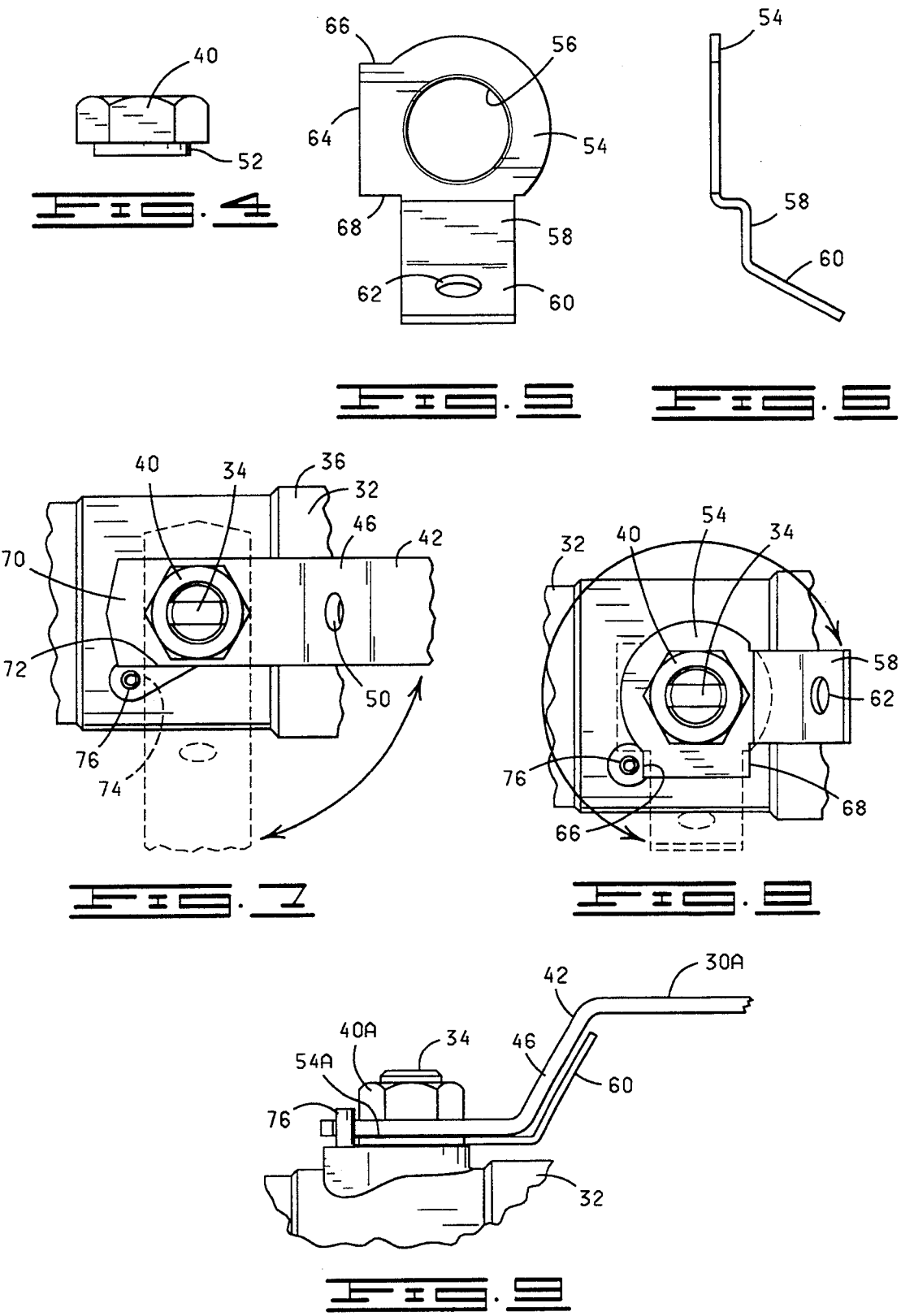

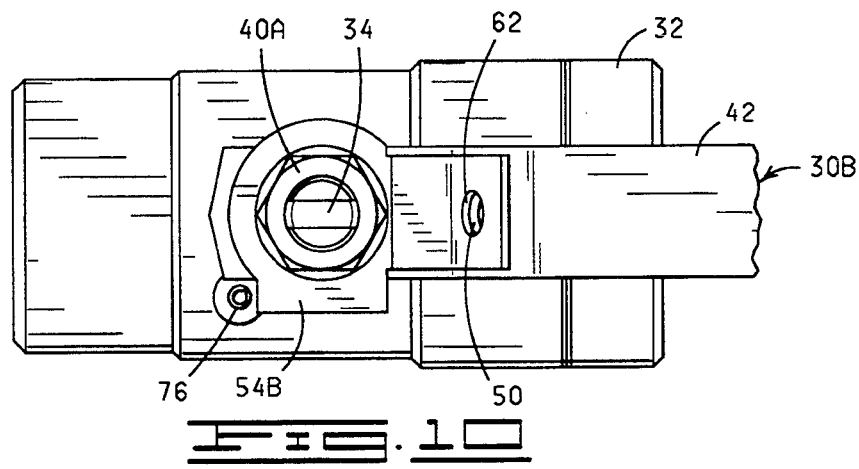
FIG. 10
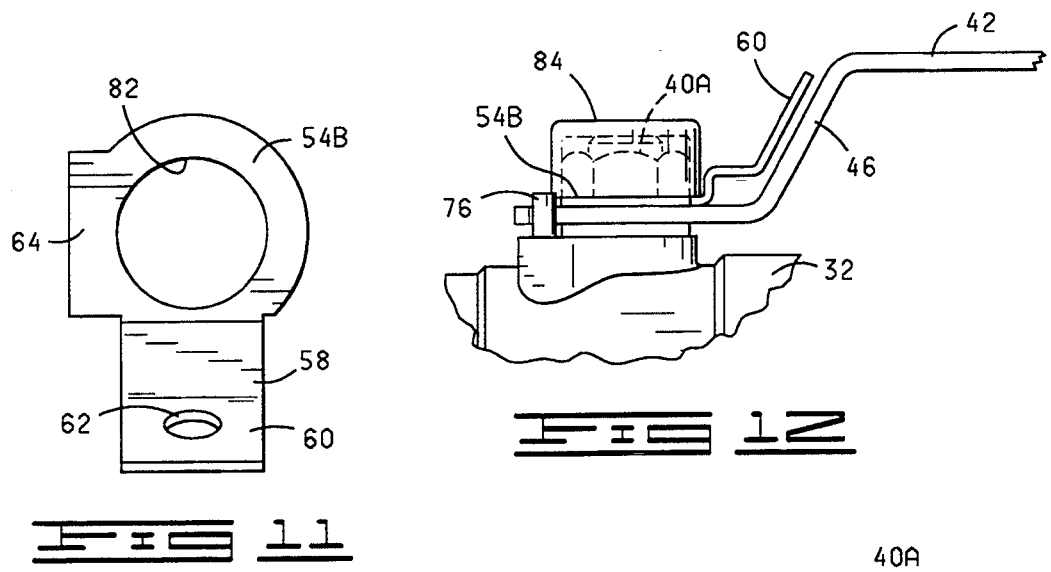
FIG. 11
FIG. 12
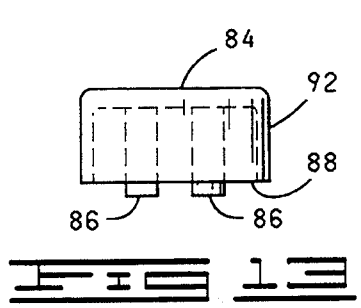
FIG. 13
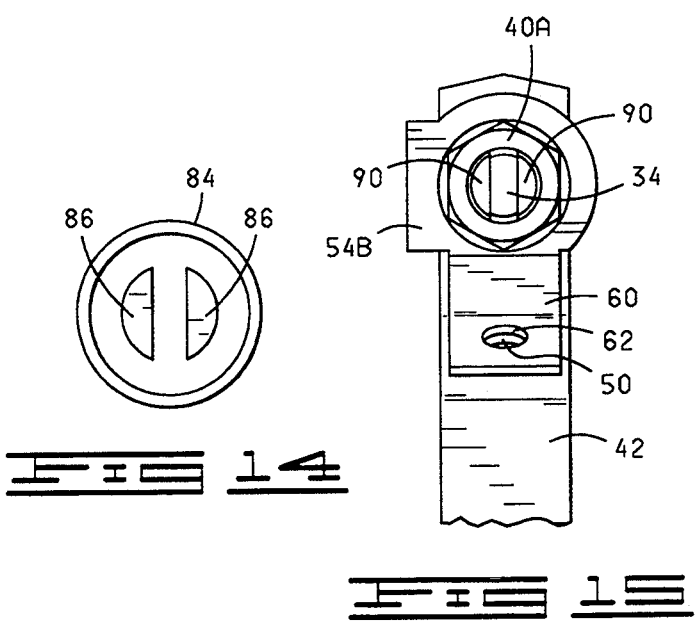
FIG. 14
FIG. 15

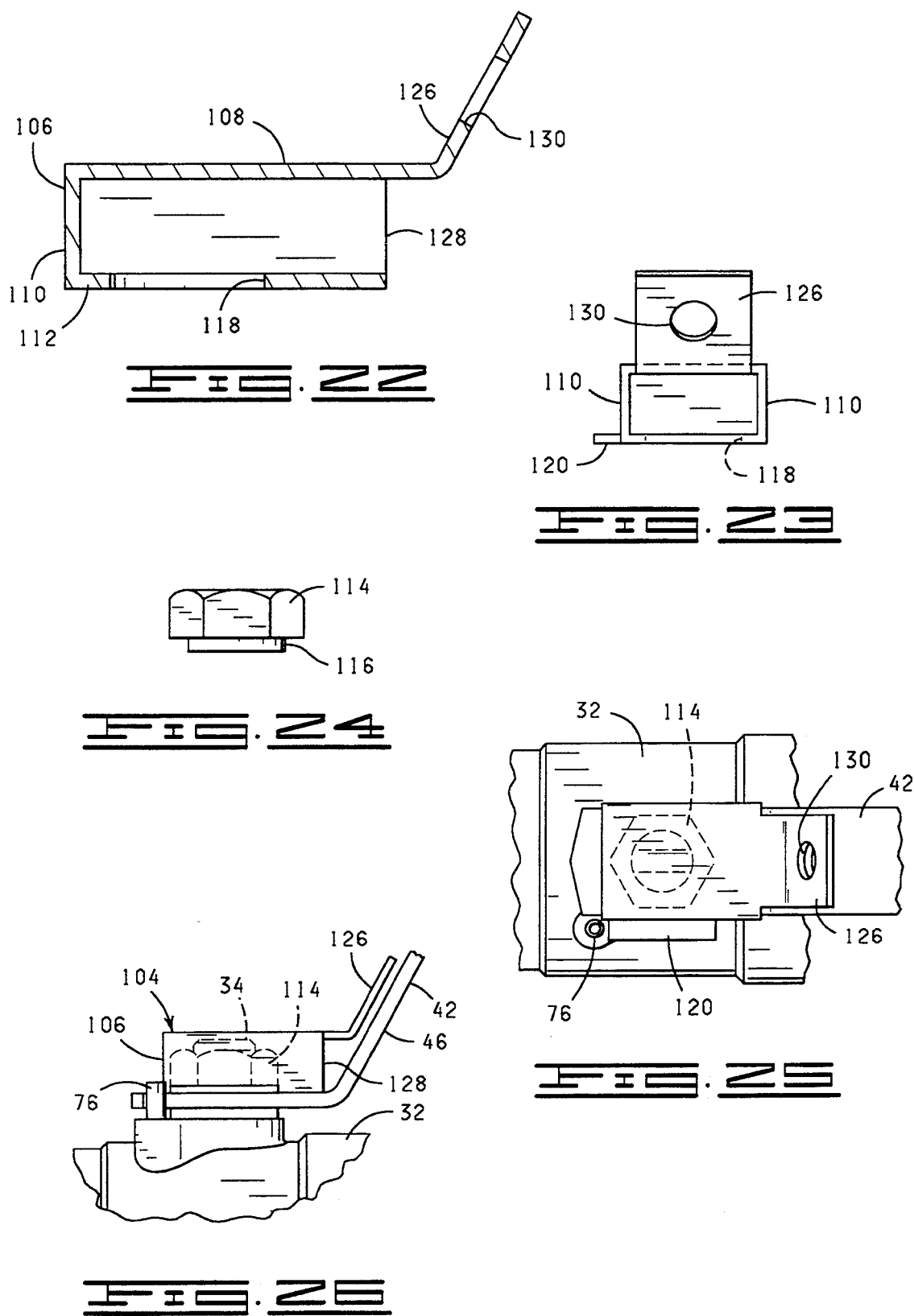

VALVE WITH SAFETY LOCK PLATE

CROSS REFERENCE TO RELATED APPLICATION

This application is a continuation-in-part of application Ser. No. 08/132,588 filed Oct. 6, 1993 and entitled VALVE WITH SAFETY LOCK-OUT now U.S. Pat. No. 5,323,805 issued Jun. 28, 1994.

FIELD OF THE INVENTION

This invention relates to improvements in techniques for locking a valve in either a fully open or a fully closed position.

BRIEF DESCRIPTION OF THE DRAWINGS

FIG. 1 is a plan view of a valve showing the valve in a fully open position and showing the locking structure of this invention.

FIG. 2 is a side view of the valve shown in the position of FIG. 1, also illustrating a lock.

FIG. 3 is a plan view similar to FIG. 1, with the valve in a fully closed position.

FIG. 4 is a side view of a stem nut.

FIG. 5 is a top view of a lock plate.

FIG. 6 is a side view of the lock plate of FIG. 5.

FIG. 7 is a plan view of a portion of the structure shown in FIG. 1, with the lock plate removed and showing the handle in phantom when the valve is closed.

FIG. 8 is a plan view similar to FIG. 7, with the handle removed and illustrating the alternate positions of the lock plate.

FIG. 9 is a side view of a second embodiment of a locking structure.

FIG. 10 is a plan view of the valve of FIG. 1 showing another embodiment of a locking structure.

FIG. 11 is a plan view of the lock plate used in the structure shown in FIG. 10.

FIG. 12 is a partial side view of the structure of FIG. 10 with the addition of a cap over the stem nut.

FIG. 13 is a side view of the cap.

FIG. 14 is a bottom view of the cap shown in FIG. 13.

FIG. 15 is a plan view of the stem, stem nut and lock plate suitable for use with the cap shown in FIGS. 13 and 14.

FIG. 22 is a cross-sectional view taken along lines 22—22 of FIG. 21.

FIG. 23 is a side view of the lock plate and stem nut enclosure looking at the right hand end of the structure shown in FIG. 21.

FIG. 24 is a side view of the stem nut used with the structure shown in FIGS. 21, 22 and 23.

FIG. 25 is a plan view of a locking structure using the lock plate and enclosure of FIG. 21.

FIG. 26 is a side view of the structure shown in FIG. 25.

DESCRIPTION OF THE PREFERRED EMBODIMENTS

Figure 16:
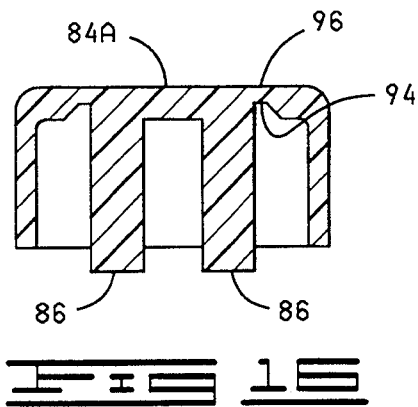
FIG. 16 is a cross-sectional view through a modified cap construction.

Referring to the drawings in detail, and particularly FIGS. 1-3, reference character 30 generally designates a locking structure for a valve 32 of the type wherein the valve member (not shown) is turned less than 360 degrees between fully open and fully closed positions, such as a ball valve. The valve stem 34 of the valve 32 projects from the valve body 36. The outer end portion 38 of the valve stem 34 is rectangular in cross section and has external threads thereon for reception of a stem nut 40.

The valve handle 42 has an opening (not shown) therethrough sized to mate with the outer end portion 38 of the valve stem 34, such that the valve stem will be turned upon turning movement of the handle 42 to open and close the valve 32. As shown in FIG. 2, the valve handle 42 extends for a short distance at right angles to the valve stem 34 and then is bent to form a portion 46 extending outwardly from the valve 32 at an angle, and is then again bent to provide an outer end portion 48 again extending at right angles to the axis of the valve stem 34. As shown in FIG. 7, the angled portion 46 of the handle 42 has an aperture 50 therethrough which forms a locking aperture, as will be set forth more fully below.

As shown in FIG. 4, the stem nut 40 has a cylindrical projection 52 on the end thereof facing the valve 32.

A lock plate 54 (FIG. 2) is journaled on the projection 52 of the stem nut 40 and has an aperture 56 (FIG. 5) therethrough of a size to slidingly receive the cylindrical projection 52. The lock plate 54 has a handle portion 58 extending generally away from the valve stem 34 which, in turn, has an angled portion 60. The angled portion 60 is constructed to be parallel with the angled portion 46 of the handle 42 when the lock plate 54 and handle 42 are extended in the same direction, as shown, for example, in FIGS. 2 and 3. Also, the angled portion 60 of the lock plate 54 has a locking aperture 62 therethrough sized and positioned to mate with the locking aperture 50 of the handle 42 when the handle and locking plate are in either of two alternate positions.

A projection 64 extends from one side of the locking plate 54 to provide opposing shoulders 66 and 68, both of which extend basically at right angles to the handle portion 58 of the locking plate. Similarly, what may be considered the inner end portion 70 of the handle 42 has what is called herein a shoulder 72 thereon at one side of the handle and a second portion 74 of the same side of the handle 42, as shown in phantom in FIG. 7, forms what is also called a shoulder herein.

The shoulders on the lock plate 54 and handle 42 are arranged to mate with a stop pin 76 rigidly secured in the valve body 36 parallel with and spaced from the valve stem 34. The pin 76 is located in a position to be engaged by the shoulders 66 and 68 of the lock plate 54 and shoulders 72 and 74 of the handle 42, as will be described.

FIG. 7 illustrates the two positions of the handle 42 when the valve 32 is of the type where the valve stem 34 is moved ninety degrees between the fully open and fully closed positions of the valve. As shown in FIG. 7, when the handle 42 is in the fully open position of the valve 32, the shoulder 72 engages the stop pin 76 to prevent the handle 42 from being moved beyond the fully closed position of the valve. FIG. 7 also illustrates, in phantom, that when the handle 42 is moved clockwise ninety degrees to fully open the valve 32, the other portion 74 of the side of the handle 42 engages the stop pin 76 to prevent further opening movement of the valve.

FIG. 8 illustrates the movement of the lock plate 54 when the valve 32 is moved between its fully open and fully closed positions, whereby the valve may be locked in the selected position. As shown in FIG. 8, when the lock plate 54 is in a locking position for the closed position of the valve 32, the shoulder 66 of the lock plate engages the stop pin 76 and prevents movement of the lock plate 54 in a clockwise direction. On the other hand, when the lock plate 54 is turned through 270 degrees counter clockwise, the opposite shoulder 68 engages the stop pin 76 to prevent further counter clockwise movement of the lock plate 54. In this latter position of the lock plate 54, the valve 32 will be in a fully opened position.

FIGS. 2 and 3 show the positions of the lock plate 54 and handle 42 with the valve fully assembled. As shown in FIG. 2, when the handle 42 is in the fully closed position of the valve, it can be locked in this position by positioning the lock plate 54 with one shoulder 66, of the lock plate in engagement with the stop pin 76. Thus, in this position of the handle 42 and lock plate 54, the handle will be prevented from moving counterclockwise beyond the fully closed position of the valve and the lock plate will be prevented from moving clockwise. Thus, when the shank 78 of a lock 80 is inserted through the mating apertures 50 and 62 of the handle and lock plate, respectively, the valve 32 will be locked in a fully closed position. It will also be noted that the stem nut 40 securely holds the handle 42 and lock plate 54 on the valve stem 34.

When the valve 32 is fully closed, the handle 42 and lock plate 54 are positioned as shown in FIG. 3, such that the valve may also be locked in this position.

FIG. 9 illustrates a modified locking structure 30A in that, principally, the handle and lock plate are reversed. A modified stem nut 40A is threaded on the outer end portion of the valve stem 34 and does not have a cylindrical projection on the end thereof facing the valve 32. The handle 42 is placed on the stem 34 next to the modified stem nut 40A. The modified lock plate 54A has an aperture therethrough sized to receive the adjacent portion of the stem 34 between the handle 42 and the valve 32, such that the modified lock plate will be journaled on the valve stem 34. The modified lock plate 54A is also bent to provide an angled portion 60 parallel with the portion 46 of the handle 42, such that the same mating apertures in these two members will be provided in the manner shown in the previous embodiment. The modified lock plate 54A is otherwise the same as the original lock plate 54, such that the valve 32 may be locked in either a fully open or a fully closed position with the modified locking structure 30A.

Another locking structure 30B is illustrated in FIGS. 10–15. This embodiment utilizes the same handle 42 and the modified stem nut 40A. A slightly modified lock plate 54B is provided with an opening 82 therethrough sized to receive the modified stem nut 40A, such that the modified lock plate 54B will be journaled on the stem nut. Otherwise, the modified locking plate 54B is constructed in the same manner as the locking plate 54 previously described, such that the valve 32 can be locked in a fully open or a fully closed position in the same manner as previously described.

The modified locking structure 30B further includes a cap 84, preferably formed of a plastic material, such as a suitable thermoplastic resin. The cap 84 is sized to fit closely over the item nut 40A and has a pair of tabs 86 therein extending beyond the open end 88 of the cap. The tabs 86 are shaped in cross section to fit the openings 90 between the inner periphery of the stem nut 40A and the sides of the stem 34 when the cap 84 is positioned over the stem nut 40A. In a preferred embodiment, the tabs 86 are slightly oversized to be wedged into the openings 90 and be wedged into the threads on the outer periphery of the stem 30 and the inner periphery of the stem nut 40A; thereby inhibiting removal of the cap 84. The outer surface of the cap 84 is smooth, and the length of the walls 92 of the cap 84 are such that when the cap 84 is seated on the outer end of the stem 34, the inner edges of the wall 92 are deformed against the lock plate 54B.

The modified locking system 30B operates in the same manner as the locking system 30 previously described, such that the valve 32 can be locked in a fully open or a fully closed position.

FIG. 16 illustrates a modified cap 84A in that a relief 94 is provided in the top wall 96 of the cap around the tabs 86. With this arrangement, the cap 84A will be fractured at the relief area 94 in the event an unauthorized person attempts to pry the cap 84A off of the valve stem 34. Thus, tampering of the valve would be evident.

Figure 17:
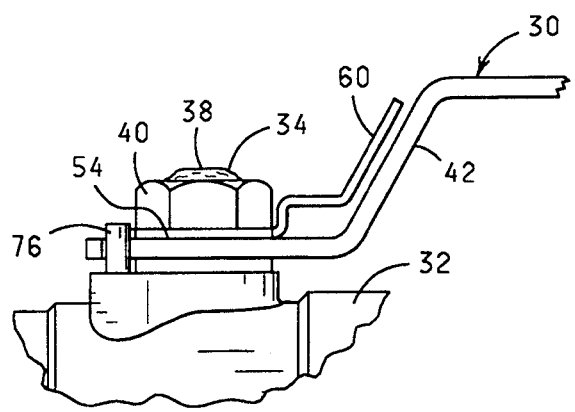
FIG. 17 is a side view of another embodiment of a locking structure.

FIG. 17 illustrates a modification of the locking structure 30 previously described in that the outer end 38 of the valve stem 34 is deformed over the stem nut 40. With this arrangement, the stem nut 40 can not be removed without severe damage to the valve assembly.

Figure 18:
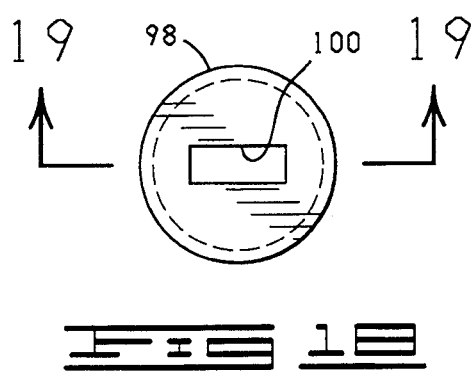
FIG. 18 is a plan view of a security cover useful with the locking structure shown in FIG. 17.
Figure 19:
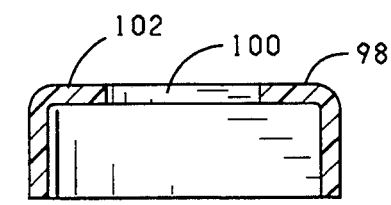
FIG. 19 is a cross-sectional view taken along lines 19—19 of FIG. 18.
Figure 20:
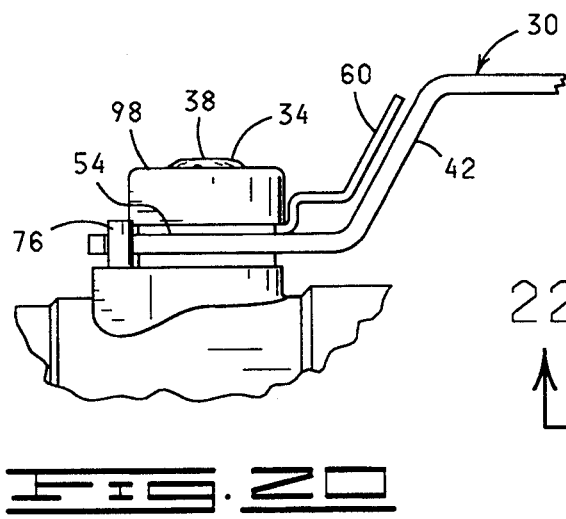
FIG. 20 is a side view of the structure of FIG. 17 with the security cover of FIGS. 18 and 19 thereon.

FIGS. 18, 19 and 20 show a security cover 98 which may be used in connection with the locking system 30 previously described. The security cover 98 is in the form of a cap formed of, for example, a plastic-type material, such as a thermoplastic resin, to fit closely around the stem nut 40. A rectangular opening 100 is provided in the top 102 of the cover 98 to fit around the valve stem 34 when the cover is fully in position over the nut 40. When the security cover 98 is in its fully seated position, the outer end portion 38 of the valve stem 34 may be deformed over the top 102 of security cover adjacent the opening 100 to further secure the locking system against tampering.

Figure 21:
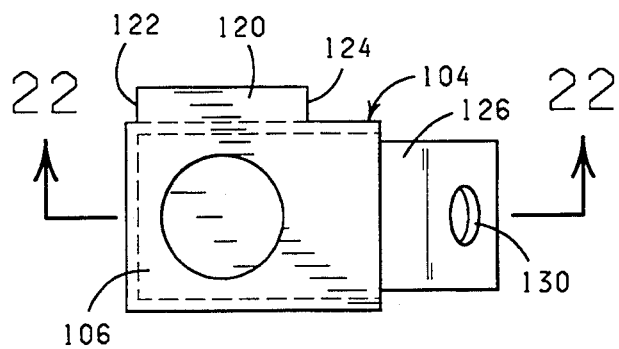
FIG. 21 is a plan view of an alternate locking plate and stem nut enclosure.

FIGS. 21–26 disclose another modified locking structure, principally through use of a combination lock plate and enclosure, generally designated by reference character 104. The combined structure includes an enclosure portion 106 having a top wall 108, side walls 110 around three sides of the structure and a bottom wall 112. The enclosure portion 106 is sized to receive the main body portion of a stem nut 114. A cylindrical projection 116 is provided on the end of the nut 114 which will face the valve, and an aperture 118 is formed in the bottom wall 112 of the enclosure portion 106 sized to be journaled on the nut projection 116. As shown in FIGS. 21 and 23, a projection 120 extends from one side of the enclosure portion 106 to form a pair of shoulders 122 and 124 similar to the shoulders 66 and 68 of the previously discussed lock plate 54.

A plate-like portion 126 extends from the enclosure portion 106 above the open end 128 of the enclosure portion 106 and then extends at an angle essentially corresponding with the angled portion 60 of the previously described lock plate 54. A locking aperture 130 is provided in the angled portion 126.

The modified structure illustrated in FIGS. 21-26 is assembled by first placing the handle 42 on the stem 34 and then placing the enclosure portion 106 adjacent the outer surface of the handle 42 around the stem 34, with the nut 114 positioned therein. The nut 114 is then threaded onto the stem 34 through a suitable tool (not shown) reaching through the open end 128 of the enclosure portion 106, to fully seat the enclosure portion 106 onto the handle 42.

The modified enclosure and lock plate structure 104 then operates in the same manner as the embodiments previously disclosed, such that the valve 32 can be locked in either a fully open or closed position by the structure 104 and the handle 42 engaging the lock pin 76 in substantially the same manner as previously described. As shown in FIG. 26, when the structure 104 is in a locking position over the handle 42, the combination of the angled portion 46 of the handle 42 and the angled portion 126 of the structure 104 effectively closes the open end 128 of the enclosure portion 106 to prevent unauthorized unthreading of the stem nut 114.

Changes may be made in the combination and arrangements of parts or elements as heretofore set forth in the specification and shown in the drawings without departing from the spirit and scope of the invention as defined in the following claims.

What is claimed is:

1. In a valve of the type having a valve stem which is turned less than 360 degrees between the fully open and fully closed positions of the valve by use of a handle secured to the stem near the outer end of the stem, the improvement comprising:
    a fixed stop pin projecting from the valve substantially parallel with and spaced from the valve stem;
    first and second shoulders on the handle, the first shoulder being arranged to engage the stop pin when the valve is fully open to prevent further opening movement of the valve, and the second shoulder on the handle being arranged to engage an opposite side of the stop pin when the valve is fully closed to prevent further closing movement of the valve;
    a lock plate journaled on the valve stem adjacent the handle having a first shoulder thereon positioned to engage the side of the stop pin opposite to the first shoulder on the handle when the valve is fully open, and having a second shoulder thereon positioned to engage the opposite side of the stop pin from the second shoulder on the handle when the valve is fully closed; and
    means securing the handle and the lock plate on the valve stem against removal of the lock plate and handle off of the end of the valve stem;
    wherein the lock plate and handle have adjacent portions substantially parallel with each other and lock receiving apertures therein positioned to mate when the valve is fully open or fully closed, whereby the valve may be locked in either a fully open or a fully closed position.

2. The structure defined in claim 1 wherein the means securing the handle and the lock plate on the valve stem against removal of the handle and lock plate off of the end of the valve stem comprises a nut threaded onto the valve stem.

3. The structure defined in claim 2 wherein portions of the outer end of the valve stem extend over at least a portion of the nut.

4. The structure defined in claim 2 wherein the lock plate is positioned adjacent the surface of the handle facing the outer end of the valve stem.

5. The structure defined in claim 4 wherein the nut has a reduced diameter extension thereon extending toward the valve handle and surrounding the valve stem; and
    wherein the lock plate is journaled on said reduced diameter extension.

6. The structure defined in claim 2 characterized further to include:
    a security cover encircling the nut and covering that portion of the end of the nut facing the end of the valve stem;
    said security cover having a smooth outer surface, and the outer end portion of the stem being deformed over portions of the security cover.

7. The structure defined in claim 2 characterized further to include an enclosure formed as part of the lock plate surrounding the nut.

8. The structure defined in claim 7 wherein the enclosure includes a top wall covering the outer end of the valve stem, side walls covering at least three sides of the nut, and a bottom wall between the nut and the portion of the handle surrounding the stem.

9. The structure defined in claim 8 wherein the side wall of the enclosure has an opening therein sized for movement of the nut therethrough during assembly and disassembly of the lock plate; and wherein the lock plate and handle are shaped to cover said opening when the valve is locked in either a fully open or a fully closed position.

10. The structure defined in claim 8 wherein the nut has a projection on the end thereof facing the valve sized to journal the bottom wall of the enclosure thereon.

11. The structure defined in claim 1 wherein the portion of the handle surrounding the valve stem is positioned between that portion of the lock plate surrounding the valve stem and the outer end of the valve stem.

12. The structure defined in claim 1 wherein the first and second shoulders on the handle are located on the same side of the handle.

13. The structure defined in claim 12 wherein the first and second shoulders on the lock plate are located on opposite sides of a projection extending from one side of the lock plate.

14. The structure defined in claim 1 wherein the adjacent portions of the handle and lock plate having the lock receiving apertures therein extend at an angle to the valve with the lock receiving aperture spaced from the valve.

15. The structure defined in claim 1 wherein the means securing the handle and the lock plate on the valve stem comprises:
    a nut threaded on the valve stem between that portion of the handle surrounding the valve and the outer end of the valve stem;
    wherein the lock plate is journaled on the nut; and
    a cap wedged over the nut engaging the portion of the lock plate surrounding the nut.

16. The structure defined in claim 15 wherein the stem and nut are shaped to provide a pair of openings between the outer surface of the stem and the inner surface of the nut; and wherein the cap has a pair of tabs thereon sized and arranged to be wedged into said openings.

17. The structure defined in claim 16 wherein a portion of the tabs is deformed into the threads on the nut and valve stem.

18. The structure defined in claim 16 wherein the cap has a relief in the inner surface thereof adjacent at least one tab, whereby the cap will rupture prior to removal of the tab from the nut.

19. The structure defined in claim 15 wherein the cap is sized to engage the adjacent surface of the lock plate with some deformation of the cap.

* * * * *